United States Patent [19]

Evans

[11] Patent Number: 4,585,162

[45] Date of Patent: Apr. 29, 1986

[54] MEANS FOR AUTOMATIC AMBIENT TEMPERATURE CONTROL

[76] Inventor: Richard C. Evans, 305 Phoenix Village Rd., Muskogee, Okla. 74401

[21] Appl. No.: 744,890

[22] Filed: Jun. 14, 1985

Related U.S. Application Data

[63] Continuation of Ser. No. 570,342, Jan. 13, 1984, abandoned.

[51] Int. Cl.⁴ .................. G05D 23/00; H01H 3/16
[52] U.S. Cl. .................. 236/47; 200/61.62; 165/11.1
[58] Field of Search .............. 236/47; 165/11; 200/61.64, 61.62

[56] References Cited

U.S. PATENT DOCUMENTS

| | | | |
|---|---|---|---|
| 4,058,740 | 11/1977 | Dalton et al. | 165/11 |
| 4,060,123 | 11/1977 | Hoffman et al. | 236/47 X |
| 4,091,866 | 5/1978 | Curatolo | 165/138 |
| 4,095,740 | 6/1978 | Wirth | 236/47 |
| 4,293,020 | 10/1981 | Day | 165/11 |
| 4,319,712 | 3/1982 | Bar | 236/47 |
| 4,333,604 | 6/1982 | Petrillo | 165/11 R |

FOREIGN PATENT DOCUMENTS

| 1271285 | 4/1972 | United Kingdom | 200/61.64 |
|---|---|---|---|

Primary Examiner—William E. Wayner
Attorney, Agent, or Firm—Head, Johnson & Stevenson

[57] ABSTRACT

An improved automatic energy-efficient temperature control system for a room or suite of rooms. This system is used in addition to the normal temperature responsive switch which is used to control a heating and/or cooling unit. This system involves a second temperature sensitive switch, set to a temperature which utilizes less heating or cooling. While using the normal operating temperature while persons are in the room, the second temperature responsive switch is short-circuited by a manual switch, or one operated by a magnetic or gravity means. The control of the shorting switch is made responsive to the entry or departure of persons from the room. Thus while they are present, a more comfortable operating temperature is provided and when they are absent from the room, a more energy-efficient situation is imposed.

1 Claim, 4 Drawing Figures

MEANS FOR AUTOMATIC AMBIENT TEMPERATURE CONTROL

This is a continuation application of Ser. No. 570,342, filed Jan. 13, 1984 now abandoned.

BACKGROUND OF THE INVENTION

This invention lies in the field of thermostatic control of temperature in hotel or motel rooms etc. It can use any of the presently known and used temperature sensitive switches to control the heating and/or cooling elements when the room temperature is at a second selected temperature. The currently used thermostatic switches are set manually and must be changed manually if there is to be a different setting of operating temperature. This invention lies in a feature which utilizes the entrance or departure of persons from the room to control the temperature of the room. This is done automatically, by the operation of a second set of thermostatic switches. It's action is dependent on the presence or absence of a magnet attached to and made part of a door chain. So long as the occupant of that room is present, the more comfortable temperatures are used. This is arranged by the application of the door chain to its normal locking receptacle which includes, in this invention, a switch responsive to the presence of a magnet in the chain.

SUMMARY OF THE INVENTION

Before explaining the present invention in detail, it is to be understood that the invention is not limited in its application to the details of the construction and arrangement illustrated in the accompanying drawing. The invention is capable of other embodiments, and of being practiced or carried out in a variety of ways. It is to be understood that the phraseology and terminology employed herein is for the purpose of description and not of limitation.

It is a primary object of this invention to both provide a thermostatic control system applicable to a conventional heating and/or air conditioning system.

It is a further object to have two sets of operating temperatures, at two different temperature levels. One level would be at a temperature comfortable to the occupants of the room, and the second one would be at a more energy conservative temperature, in which, if it were a heater control, would operate at a lower temperature, and vice verse for an air conditioning control.

It is very well known among home owners and hotels, motels, etc., that less fuel is required if the temperature control is set to a lower temperature when heating and set to a higher temperature when the room is being cooled. However, persons occupying the room normally set the temperatures where they can be quite comfortable. It is therefore important that means be made available to change the operating temperatures whenever the person leaves the room for a substantial period.

Of course, the occupant can always set the thermostat manually to a lower or higher temperature as necessary when he leaves the room for any length of time. However, this invention utilizes an automatic means for controlling this temperature from one set of conditions to another. The room which the person is occupying, such as a hotel or motel room, has a door chain, which is attached to the door jams whenever the person is in the room and, is removed whenever the person leaves the room. Thus, the switching of temperature control can be made automatic by using a switch which is responsive to the presence of the door chain. For example, a magnet can be attached to the door chain, cooperating with a magnetic switch, so that without thinking, the temperature control is shifted each time the person enters the room or leaves the room. Thus, the occupant does not need continual reminding of the situation.

The method of operating is to have two set of thermostatic switches. One would be the normal one and would be used to set the temperature for normal comfort. The second one would be set to temperatures which would provide more fuel economy. When the occupant is not in the room the temperature will remain at a lower temperature than would be comfortable for a person in the room.

BRIEF DESCRIPTION OF THE DRAWINGS

These and other objects and advantages of this invention and a better understanding of the principles and details of the invention will be evident from the following description taken in conjunction with the appended drawings in which.

DESCRIPTION OF THE PREFERRED EMBODIMENT

Figure 1:
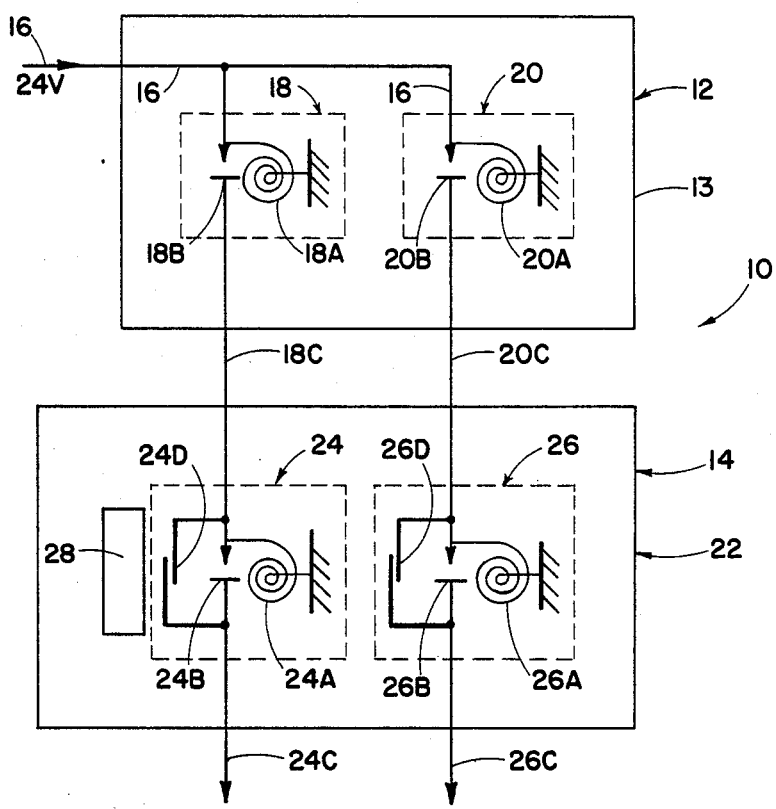
FIG. 1 represents schematically the situation where a conventional heating and/or cooling control system is used and which is added the automatic control of the system with improved energy economy.

FIG. 1 is a schematic diagram illustrating the general system of this invention, applied to a temperature control system as presently utilized in industry and the home. This is shown generally by the numeral 10. It includes a two-part system. The first part indicated generally by the numeral 12 would be the thermostatic control apparatus as applied to the normal heating and cooling system. Nothing is shown of the power circuits for the heating and/or cooling machine and nothing is shown as to how the control signals from this invention get to control the heating and cooling system.

The reason for this is because each of the power units is different and is controlled in a slightly different way, all of which is well known to the man skilled in the art and need not be described further.

The box 13 represents a thermostatic controller for controlling the on/off characteristics of a heating and/or cooling system. While a single thermostat can be used to operate this dual system separately. Two thermostatic switches are shwon, one for the heating and one for the cooling for clarity. Numeral 18 is the heating system and number 20 is the cooling system. The thermostats 18 and 20 are shown schematically as a switch 18 and 20 controlled by a thermally sensitive bimetal strip, or bellows etc. Any of the presently known and operating thermostatic devices can be used so that further detail of the thermostatic devices themselves is well known and not necessary to describe further. The operation of the heating control 18 is to control the closing of the switch 18B, responsive to the thermal element 18A so that current from a 24 volt lead 16 can pass through the switch 18B along a control conductor 18C.

Normally, the conductor 18C would go to a relay which would apply power to the open the gas valve, for instance. The relay would start the compressor so the air conditioner can start cooling. The air conditioners and furnaces are not described since they are standard devices and this invention is directed only to the method of controlling the operating temperature of these devices.

The numeral 14 indicates generally a second thermostatic control device similar to that shown by numeral 12 and it includes two thermally responsive switches 24B and 26B responsive to the thermal elements 24A and 26A respectively. These thermal elements are very similar to those in the control unit 12 but have a switch 24D and 26D respectively, which are connected across the thermal control contacts 24B and 26B respectively. Normally, these contacts are open and the operation of the device 14 is enabled by the switches 24D and 26D so that control on the output operating conductors 24C and 26C are simply the same signals as on conductors 18C and 20C respectively and are due only to the normal thermocontrol means 12.

Assume that the switches 24D and 26D are magnetically sensitive so that they are normally open except when a magnet 28 is pressed against the side of the box 24. This will close the switch and permit control by the thermostats 18 or 20, respectively. This magnet can be arranged by means of a lever, or preferably can be used or attached to a door chain such that so long as the person occupies the room the door chain will be in place such as for example during the night when he is sleeping. The temperature will be raised if it is in the heating cycle and will be decreased if it is in a cooling cycle.

Figure 2:
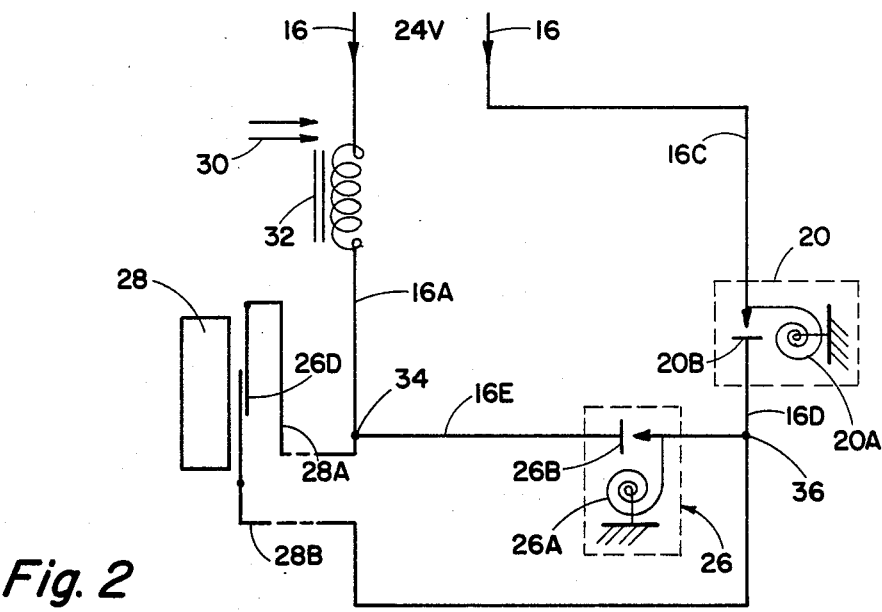
FIG. 2 represents schematically a system wherein a window air conditioning unit, for example, is utilized.

Referring now to FIG. 2, there is shown schematically, with a little more detail, the embodiment applied to a window type refrigerating cooling unit. The electrical power is applied to the compressor by means of a relay 32 which with contacts 30 such that when cooling is required the relay contacts will be closed applying power to the compressor and thus cooling the room. The control power is generally is 24 volts alternating current on leads 16 and the relay 32 is across these terminals through at the least the normal thermostat 20, having contacts 20B and thermal control 20A similar to that of FIG. 1.

Following the design of FIG. 2 there is a second thermostatic switch 26 in series with the conventional thermostatic control 20. Also, there is a switch 26D which is connected across the second thermostatic switch 26B by means of the leads 28A and 28B to junctions 34 and 36. This switch 26D, is normally open.

If the occupant is in the room or living area then the thermostat 20 will be set to a low enough temperature to be comfortable for persons in the room. On the other hand, the second thermostat 26 will be set to a higher control temperature on switch 26B so that in the absence of persons in the room less cooling effort or energy would be required. The switch 26D would be normally open. In other words, if the chain including the magnet is locked the magnet in proximity to the contact 26D will close the contact thus putting the full control of the cooling on the thermostat 20. On the other hand, when the door chain is off the door, the magnet switch opens and the second thermostat 26 then becomes active and the room is maintained at a higher operating temperature than when the chain is in place.

Figure 3:
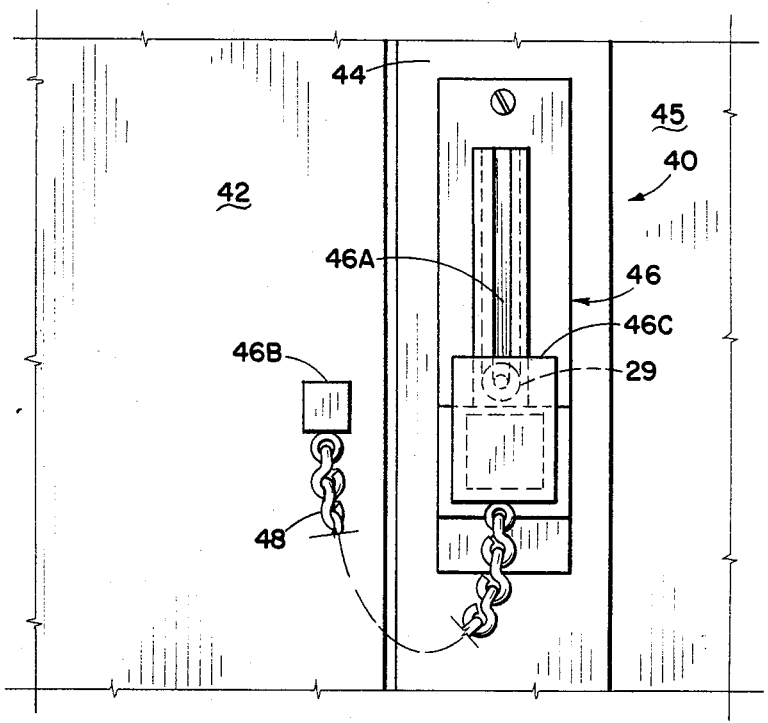
FIGS. 3 and 4 illustrate two side elevations of a possible embodiment wherein the door chain, which is used to lock the door when the occupant is in the room is modified with a magnetic element to act as an automatic control of the heating and cooling system.
Figure 4:
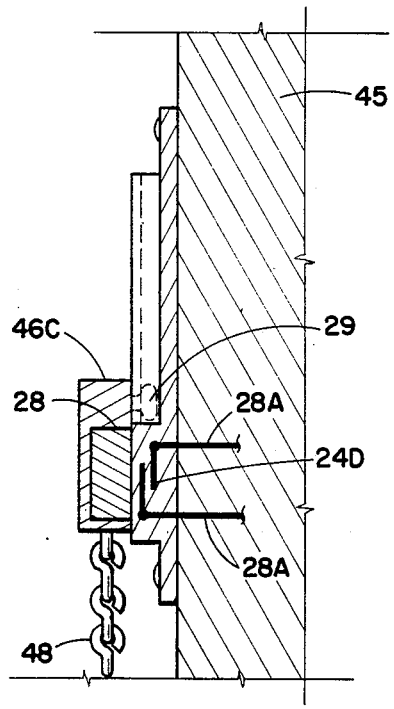

In FIGS. 3 and 4 there are two views, both in elevation, illustrating schematically a type of door chain unit. One end of the chain is attached to the door 42 at 46B and is attached to a device 46C, with a locking knob 29, which would slide in the groove 46A of the receptacle 46, which would be screwed to the door jamb 44, on the wall 45. Thus, if the person as he comes into the room for a substantial period, wanted the temperatures up to normal, he would apply the door chain 48 across the door providing greater safety for himself, and controlling the thermostatic device by the thermostatic switch 20. The magnet 28 is housed in the chain device 46C.

In summary therefore, the invention involves two sets of thermostatic switch controls by means of which the room temperature can be set to any desired value while the person is in the room and to a different temperature when he is out of the room. To do this the contact switches 24D, 26D, the thermal control of which, is set to a cool enough temperature in the room to satisfy the room occupant. On the other hand, to do this, the switch 26D must be closed, which shuts and disables the control 26. When the occupant leaves the room for any period of time the chain is removed from its socket, unlocking the door. The magnet 28 is removed causing the switch 26D to open and that puts the thermal control contact 26B in series with a conventional contact 20B and control to the higher room temperature. This is all done automatically as the occupant removes the chain prior to opening the door to leave the room.

It will be clear, of course, that heating and cooling are not generally used at the same time, so that two thermally responsive switches 18B and 28B are not usually provided. If there is only one thermally responsive switch, then this invention can be practiced with only a single thermally responsive switch. Thus thermostats 18 and 24 could be used, or thermostats 20 and 26 could be used.

Also it will be clear that the embodiments of FIGS. 3 and 4 can be used with a single magnet large enough to affect two side-by-side magnetically sensitive switches 24D.

It will be clear that the relay 32 of FIG. 2 can by means of its contacts 30 control an air flow control means, controlling the rates of flow of heated or cooled air to the room.

While the invention has been described with a certain degree of particularity, it is manifest that many changes may be made in the details of construction and the arrangement of components without departing from the spirit and scope of this disclosure. It is understood that the invention is not limited to the exemplified embodiments set forth herein but is to be limited only by the scope of the attached claim or claims, including the full range of equivalency to which each element therof is entitled.

What is claimed is:

1. An automatic comfort control system for use in hotel or motel rooms having an entry door and a comfort conditioning system such as a heating and/or air conditioning system, comprising:
   a first temperature responsive switch means positioned in the room and selectively settable at a minimally acceptable operating temperature;
   a second temperature responsive switch means positioned in the room and selectively settable at an ideal operating temperature, said minimally acceptable operating temperature being such as to achieve energy savings as compared to said ideal operating temperature;

a door chain unit secured to the inside of a door closing the room, the unit including an elongated groove open at one end and closed at the other end, and having adjacent the closed end a magnetically actuatable switch;

a door lock chain having one end attached to a wall in the room adjacent the door;

a magnet affixed to the other end of said chain, and having a knob thereto slideable in said groove whereby said knob may be positioned in said groove to lock the door and when in locked position the magnet is adjacent to and actuates said switch in said door chain unit; and conductors connecting said first and second temperature responsive switches and said magnetically actuatable switch with the comfort/conditioning system for the room and arranged such that when said magnet housing affixed to said chain is positioned with said knob in said groove said magnet actuates said switch to connect said second thermostat to control the comfort conditioning system, and when said knob is not in said groove, said switch is therby not subject to said magnet and said first thermostat is connected to control said comfort conditioning system.

* * * * *